US007978750B2

(12) United States Patent
Nunokawa et al.

(10) Patent No.: US 7,978,750 B2
(45) Date of Patent: Jul. 12, 2011

(54) MICROCONTROLLER

(75) Inventors: Hideo Nunokawa, Kawasaki (JP); Miki Suzuki, Kawasaki (JP); Hiroyuki Abe, Kawasaki (JP); Shinichi Okamoto, Nagoya (JP); Shunichi Ko, Kawasaki (JP); Hiroshi Haibara, Kawasaki (JP); Nobuhiko Akasaka, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1152 days.

(21) Appl. No.: 11/168,448

(22) Filed: Jun. 29, 2005

(65) Prior Publication Data
US 2006/0223452 A1 Oct. 5, 2006

(30) Foreign Application Priority Data

Mar. 29, 2005 (JP) ................................. 2005-095684

(51) Int. Cl.
*H04B 1/00* (2006.01)

(52) U.S. Cl. ....................................... 375/148; 712/241

(58) Field of Classification Search ............. 340/426.36; 712/233, 241; 455/73; 713/324
See application file for complete search history.

(56) References Cited

U.S. PATENT DOCUMENTS

| 2005/0076194 A1* | 4/2005 | Kanapathippillai et al. ... 712/241 |
| 2006/0068826 A1* | 3/2006 | Leonard ......................... 455/522 |
| 2006/0101369 A1* | 5/2006 | Wang et al. ...................... 716/17 |

FOREIGN PATENT DOCUMENTS

| JP | 62-208127 | 9/1987 |
| JP | 03-201156 | 9/1991 |
| JP | 08-289372 | 11/1996 |
| JP | 2000-148717 | 5/2000 |
| JP | 2000-293254 | 10/2000 |
| JP | 2004-056392 | 2/2004 |

* cited by examiner

*Primary Examiner* — David C. Payne
*Assistant Examiner* — Leon-Viet Q Nguyen
(74) *Attorney, Agent, or Firm* — Staas & Halsey LLP

(57) ABSTRACT

A microcontroller is disposed on a receiving part of a wireless system in order to process a demodulation signal generated by a receiver circuit, and includes a memory and a CPU. The memory stores a control program of the microcontroller. The control program thereof includes a dual loop routine for an operation in reception standby mode. The dual loop routine has a first loop and a second loop included in the first loop. The CPU has an instruction set consisting of a plurality of instructions, and executes the instructions according to the program stored in the memory. The CPU executes an instruction irrelevant to an operation when the microcontroller is in reception mode during the second loop a number of times. The number of times is at least such that noise caused by the repetition of the second loop is lowered below a desired level.

4 Claims, 8 Drawing Sheets

MICROCONTROLLER

CROSS REFERENCE TO RELATED APPLICATION

This application is based upon and claims the benefit of priority from Japanese Patent Application No. 2005-095684, filed on Mar. 29, 2005, the entire contents of which are incorporated herein by reference.

BACKGROUND OF THE INVENTION

1. Field of the Invention

The present invention relates to a microcontroller (MCU, Micro Controller Unit), and more particularly, to a microcontroller used in the receiving part of a system (a remote control system, etc.) processing a feeble electric wave.

2. Description of the Related Art

Recently, the development of a system having a remote operation function in wireless is in progress. For example, a system, which includes a function of starting the engine and a function of finding the location of an automobile as well as an unlocking/locking function through remote operation, has also been developed in a keyless entry system of an automobile. In such wireless remote operation, as the distance between a transmitter unit and a receiver unit becomes more distant, an electric wave becomes feeble on the part of the receiver unit. Thus, although there is a little noise (EMI, Electro Magnetic Interference), an original electric wave is buried in the noise. For this reason, the sensitivity of the receiver unit is lowered. Consequently, if the distance between the transmitter unit and the receiver unit is not reduced, there is a problem in that the remote operation cannot be normally performed. Accordingly, lowering the noise of the receiver unit has been an important issue in the system whish has the remote operation function in wireless.

For example, the receiver unit in the keyless entry system of the automobile includes a RF receiver LSI that demodulates a RF signal and a microcontroller that processes the demodulation signal generated by the RF receiver LSI. The RF receiver LSI and the microcontroller are mounted on the same system board. In this receiver unit, in order to prevent the receiving sensitivity of the RF receiver LSI from lowering due to noises generated from the microcontroller, the following noise measures are taken.

In first noise measures, when the operation frequency (the frequency of an operating clock) of the microcontroller is a fundamental frequency $f1$ (the frequency of a fundamental wave), the noise is generated in harmonics ($2 \times f1$, $3 \times f1$, $4 \times f1$, etc.) whose frequency is an integral multiplication of the fundamental frequency $f1$. Therefore, The operation frequency of the microcontroller or a receiving frequency band are set so that these harmonics are not included in the receiving frequency band of the RF receiver LSI. For example, when the receiving frequency band of the RF receiver LSI is 314 to 316 MHz, if the operation frequency of the microcontroller is set to 15.75 MHz, 20-order harmonic ($20 \times 15.75$ MHz=315 MHz) is included in the receiving frequency band. Meanwhile, when the operation frequency of the microcontroller is set to 15.85 MHz, any one of the harmonics (19-order harmonic: $19 \times 15.85$ MHz=301.15 MHz, 20-order harmonic: $20 \times 15.85$ MHz=317 MHz) can be not included in the receiving frequency band.

In second noise measures, when the frequency of an external output signal (a signal output from an external terminal) of the microcontroller is a fundamental frequency $f2$ in the same manner as the operation frequency of the microcontroller, the microcontroller operates so that harmonics whose frequency is an integral multiplication of the fundamental frequency $f2$ are not included in the receiving frequency band of the RF receiver LSI. In third noise measures, physical noise measures are given to the system board on which the RF receiver LSI and the microcontroller are mounted. Specifically, lowering noise can be accomplished by forming a GND layer through multi-layering of the system board, by blocking noise from the microcontroller toward the RF receiver LSI through installation of a metal cover surrounding the RF receiver LSI, or by using a lot of noise-prevention components (a condenser, an inductor, etc.).

Further, Japanese Unexamined Patent Application Publication No. Hei8-289372 discloses a technology in which a remote control signal from an electronic key can be obtained reliably without being influenced by noise in a keyless entry system of an automobile.

In the above-mentioned the third noise measures, however, since physical noise measures have to be taken against the system board, the cost of the receiver unit (i.e., the cost of the system) increases. Although the first to third noise measures are taken, an noise reducing effect is not sufficient. Accordingly, it is necessary to develop the system that the receiving sensitivity of the RF receiver LSI, i.e., the distance between the transmitter unit and the receiver unit, is sacrificed, which can be remotely controlled, by some degree.

SUMMARY OF THE INVENTION

The present invention has been made to solve the above-mentioned problems, and it is an object of the present invention to easily realize the lowering of noise without the increase of the cost for the receiving part of a wireless system.

According to a first aspect of the invention, a microcontroller is disposed on a receiving part of a wireless system in order to process a demodulation signal generated by a receiver circuit, and includes a memory and a CPU. The memory stores a control program of the microcontroller. The control program of the microcontroller includes a dual loop routine for an operation in reception standby mode. The dual loop routine has a first loop and a second loop included in the first loop. The CPU has an instruction set consisting of a plurality of instructions, and executes the instructions according to the program stored in the memory. The CPU executes an instruction irrelevant to an operation when the microcontroller is in reception mode (operation for processing the demodulation signal from the receiver circuit) during the second loop a number of times. The number of times is at least such that noise caused by the repetition of the second loop is lowered below a desired level.

As the number of times in which the CPU executes the instruction irrelevant to the operation when microcontroller is in reception mode during the second loop increases, the repetition cycle of the second loop increases. Thus, a fundamental wave of the noise caused by the repetition of the second loop becomes a low frequency wave. As the frequency of the fundamental wave decreases, a peak value of noise is finally lowered below a background level (a level in which the microcontroller will not operate). In this state, although a number of harmonics are included in a receiving frequency band of a receiver circuit, the peak value of the harmonics does not exceed the background level. That is, it is possible to reduce noise caused by the repetition of the second loop. Accordingly, since the CPU executes an instruction irrelevant to the operation when the microcontroller is in reception mode during the second loop, physical noise measures (multi-layering of a system board, installation of a metal cover, many uses of noise-prevention components, and the like) can become unnecessary. Therefore, it is possible to easily realize the lowering of noise without increasing the cost.

Further, in the microcontroller according to the first aspect of the invention, it is preferable that the plurality of instructions include an NOP (No operation) instruction. The CPU executes the NOP instruction during the second loop a number of times. The number of times is at least such that noise caused by the repetition of the second loop is lowered below a desired level. In general, since the instruction set of the CPU includes the NOP instruction, it is possible to easily realize the lowering noise without changing a hardware construction of the microcontroller.

Furthermore, in the microcontroller according to the first aspect of the invention, it is preferable that the plurality of instructions include a first dummy instruction which requires a larger number of cycles for execution than other instructions. The CPU executes the first dummy instruction during the second loop a number of times. The number of times is at least such that noise caused by the repetition of the second loop is lowered below a desired level. If it requires twice the number of cycles to execute the first dummy instruction as that of other instructions (e.g., the NOP instruction), the number of times the CPU executes the first dummy instruction in order to lower noise below a desired level can be reduced to half, compared to a case where the CUP executes other instructions. Accordingly, since the first dummy instruction is provided, it is possible to reduce the amount of a program of the second loop portion in the control program of the microcontroller. This contributes to useful utilization of the memory region.

According to a second aspect of the invention, the microcontroller is disposed on the receiving part of a wireless system in order to process a demodulation signal generated by a receiver circuit, and includes a memory and a CPU. The memory stores a control program of the microcontroller. The control program of the microcontroller includes a dual loop routine for an operation in reception standby mode. The dual loop routine has a first loop and a second loop included in the first loop. The CPU has an instruction set consisting of a plurality of instructions, and executes the instructions according to the program stored in the memory. The plurality of the instructions includes a second dummy instruction whose required number of cycles for execution varies every time. The CPU executes the second dummy instruction during the second loop in order to prevent the repetition cycle of the second loop from going constant.

Since the CPU executes the second dummy instruction during the second loop, the repetition cycle of the second loop can be changed. Thus, it is possible to distribute a fundamental wave and harmonics of noise caused by the repetition of the second loop. For this reason, it is possible to lower the probability that the peak of noise may be included in a receiving frequency band of a receiver circuit. Accordingly, since the CPU executes the second dummy instruction during the second loop, the lowering noise can be easily realized without increasing the cost, as in the above-mentioned first aspect of the invention.

In the microcontroller according to the second aspect of the invention, it is preferable that the second dummy instruction may be an instruction whose number of cycles needed for execution varies irregularly, an instruction whose number of cycles needed for execution sequentially decreases, an instruction whose number of cycles for execution sequentially increases, or an instruction whose number of cycles needed for execution repeatedly increases or decreases. The provision of the second dummy instruction makes it possible to easily prevent the repetition cycle of the second loop from going constant.

In the microcontroller according to the first or second aspect of the present invention, it is preferable that the memory and the CPU are mounted in a same package together with the receiver circuit. This makes it possible to save a space on the receiving part of the wireless system.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENT

Figure 1:
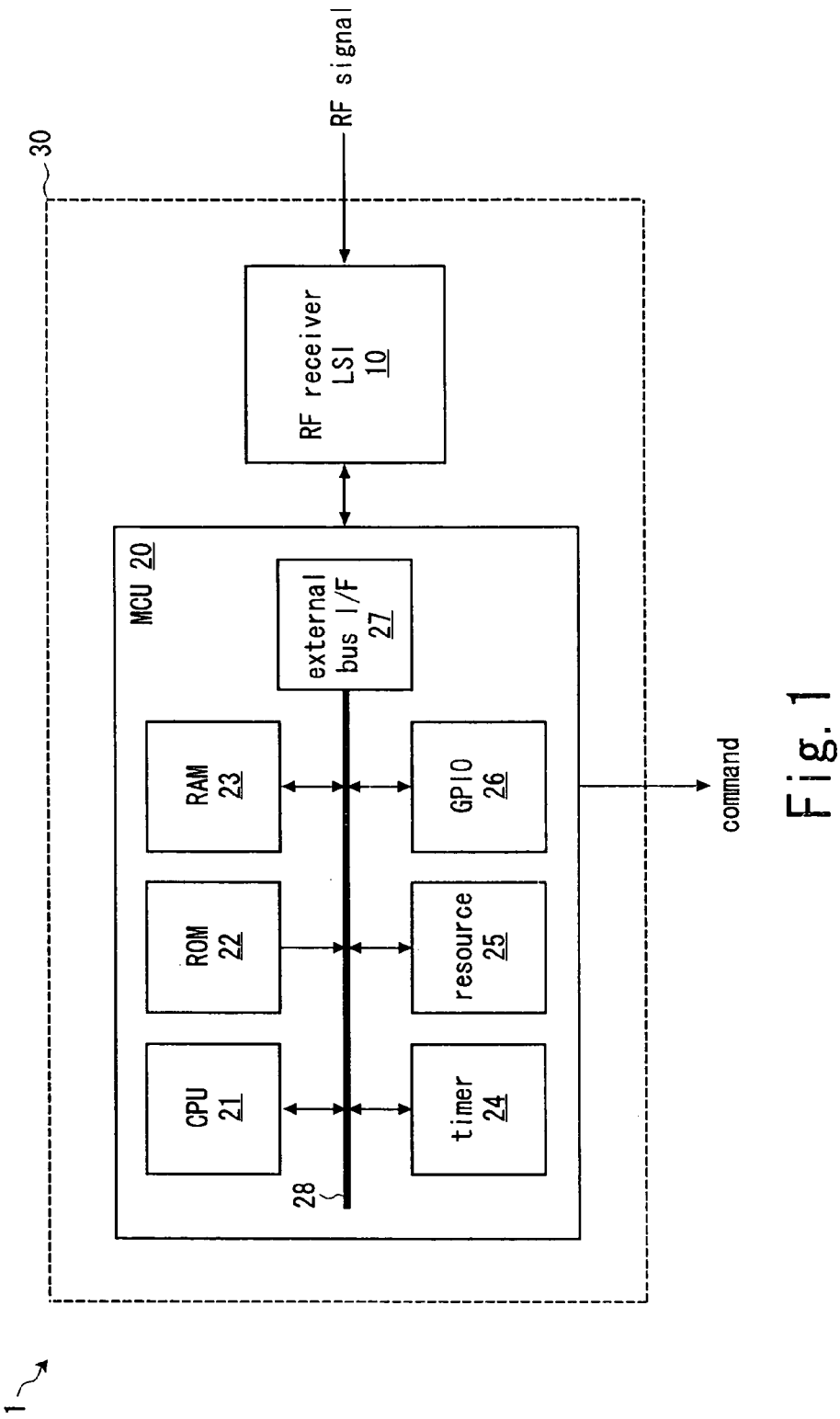
FIG. 1 is a block diagram illustrating a first embodiment of the present invention.

Preferred embodiments of the present invention will now be described with reference to the drawings. FIG. 1 is a block diagram illustrating a first embodiment of the invention. A receiver unit 1 (a receiving frequency band: 314 to 316 MHz) of a keyless entry system (a wireless system) of an automobile includes a RF receiver LSI 10 (a receiver circuit) and a microcontroller (MCU) 20. For example, the RF receiver LSI 10 and the microcontroller 20 can be formed on respective semiconductor chips, respectively, and then mounted in a same package 30.

The RF receiver LSI 10 demodulates a RF signal transmitted from a transmitter unit (not shown) of the keyless entry system, and outputs the demodulation signal (data) to the microcontroller 20. The microcontroller 20 decodes the data received from the RF receiver LSI 10 and generate a command output to a command module (not shown). The microcontroller 20 includes a CPU 21, a ROM 22 storing a control program of the microcontroller 20, a RAM 23, a timer 24, a resource 25 that implements a communication interface function, etc., a GPIO (General Purpose I/O) 26, an external bus interface (I/F) 27 and an internal bus 28.

The CPU 21 has an instruction set consisting of a plurality of instructions including the NOP instruction, and executes various instructions according to the program stored in the ROM 22. The RAM 23 temporarily stores a variety of data, operation results, and so on. The internal bus 28 interconnects the CPU 21, the ROM 22, the RAM 23, the timer 24, the resource 25, the GPIO 26 and the external bus interface 27 so that data can be transferred among them. Further, for noise measures, the operation frequency (the frequency of an operation clock) of the microcontroller 20 is set to, e.g., 15.85 MHz. Furthermore, when the frequency of an external output signal of the microcontroller 20 is a fundamental frequency, the microcontroller 20 operates so that harmonics whose frequency is an integral multiplication of the fundamental frequency is not included in the receiving frequency band of the receiver unit 1.

Figure 2:
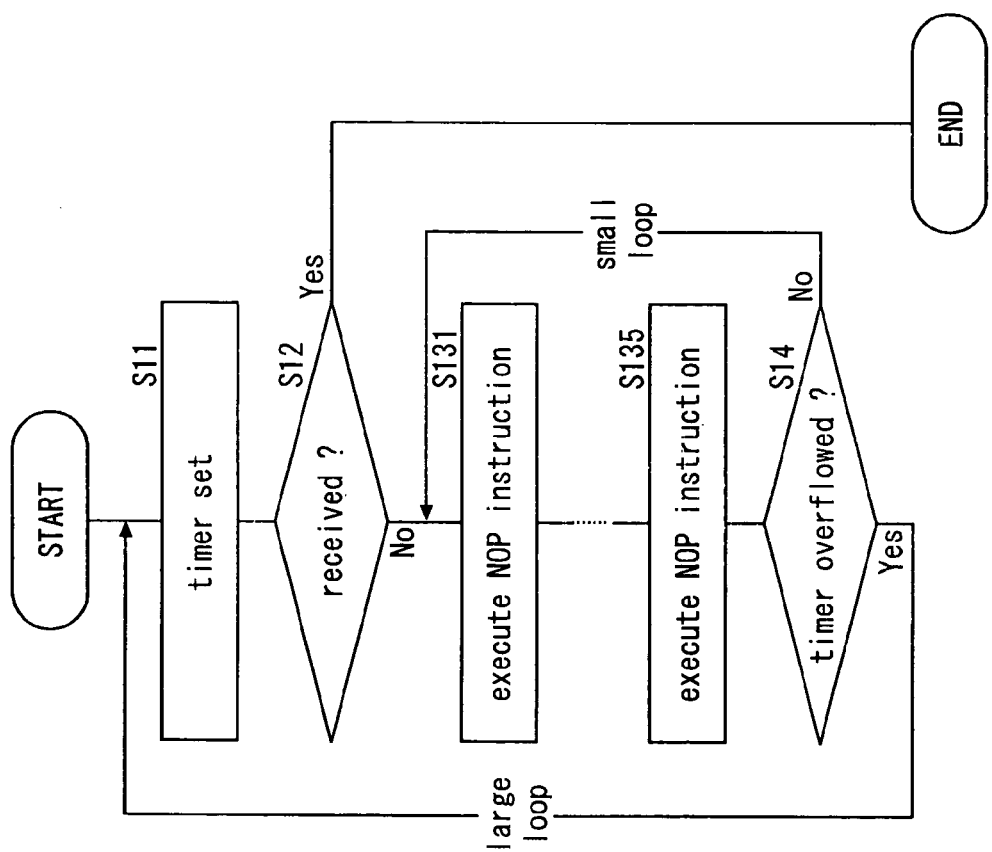
FIG. 2 is a flowchart illustrating an operation of a microcontroller in reception standby mode according to a first embodiment.

FIG. 2 shows an operation of a microcontroller in reception standby mode according to the first embodiment. This operation is performed through execution of the instruction according to the program in the RAM 22 by the CPU 21.

(Step S11) The microcontroller 20 controls the CPU 21 to set the timer 24 so that the timer overflows after a predetermined time (e.g., five millisecond) elapses and then is started. Next, the operation of the microcontroller 20 proceeds to step S12.

(Step S12) The microcontroller 20 determines whether data has been received from the RF receiver LSI 10. If it is determined that data has been received from the RF receiver LSI 10, the operation of the microcontroller 20 in the reception standby mode is completed and then the operation (the operation in the reception mode) for processing the data received from the RF receiver LSI 10 is executed. If it is determined that data has not yet been received from the RF receiver LSI 10, the operation of the microcontroller 20 proceeds to step S13.

(Steps S131 to S135) The microcontroller 20 controls the CPU 21 to execute the NOP instruction five times. When the CPU 21 executes the NOP instruction, the CPU 21 becomes a state executing nothing (standby state). Accordingly, the execution of the NOP instruction has no influence on the operation of the microcontroller 20 in the reception mode. Then, the operation of the microcontroller 20 proceeds to step S14.

(Step S14) The microcontroller 20 determines whether the timer 24 has overflowed. If it is determined that the timer 24 has overflowed, the operation of the microcontroller 20 proceeds to step S11. That is, a large loop (a first loop) consisting of steps S11 to S14 is repeatedly executed until data are received from the RF receiver LSI 10. If it is determined that the timer 24 has not overflowed, the operation of the microcontroller 20 proceeds to step S13. That is, a small loop (a second loop) consisting of steps S13 to S14 is repeatedly executed until the timer 24 overflows.

Figure 3:
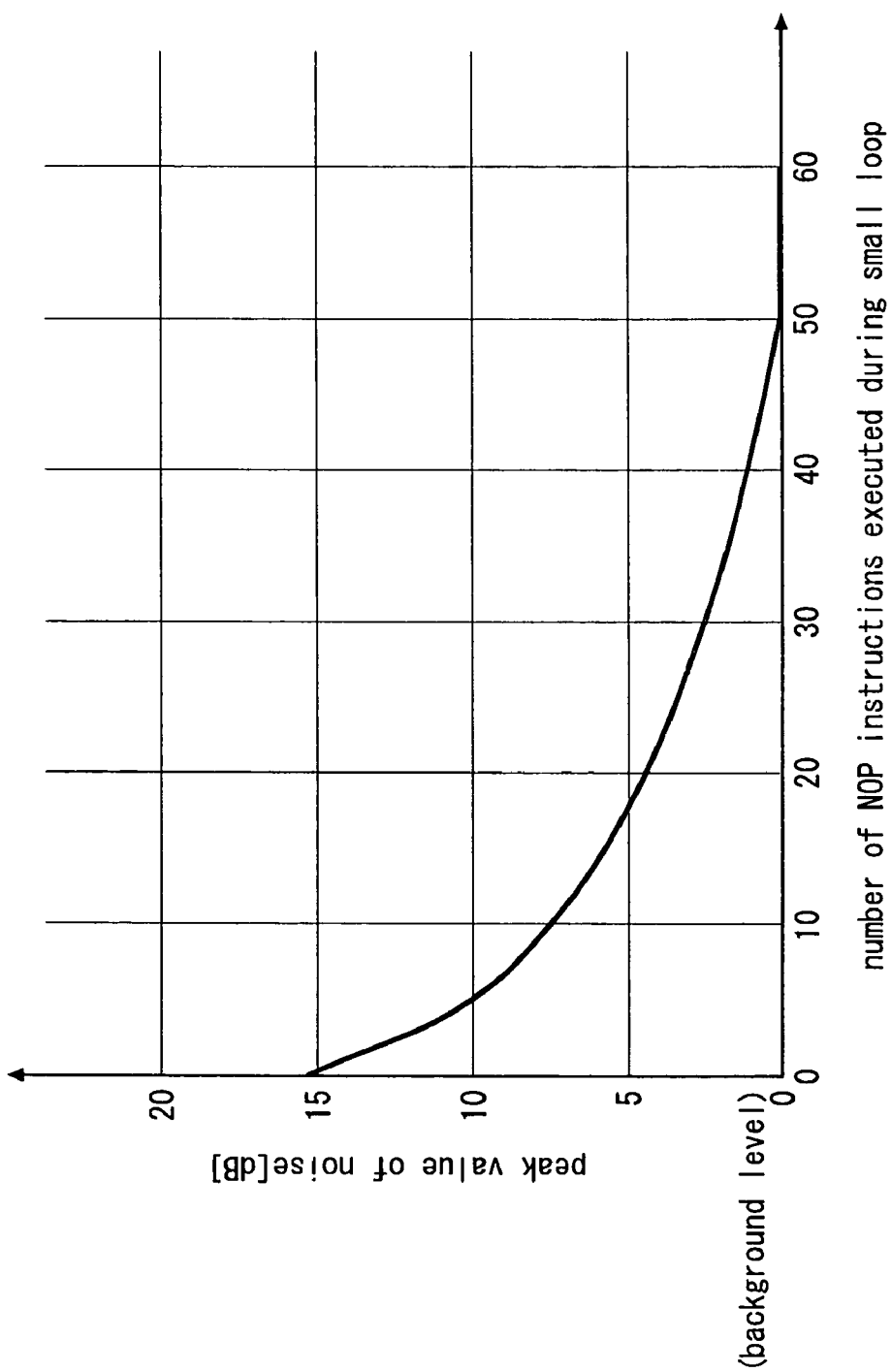
FIG. 3 is an explanatory view showing experimental results of a noise reduction effect according to the first embodiment.

FIG. 3 shows experimental results of a noise reduction effect according to a first embodiment. In FIG. 3, a vertical axis indicates the peak value of noise caused by the repetition of the small loop, and an abscissa axis indicates the number of NOP instructions, which is executed by the CPU 21 during the small loop. Further, in FIG. 3, a background level is designated by 0 dB. From FIG. 3, it can be seen that the peak values of noise decrease as the number of the NOP instructions, which is executed by the CPU 21 during the small loop, increases, and if the number of the NOP instructions executed exceeds fifty times, the peak value of noise is lowered to the background level. In the first embodiment, the CPU 21 executes the NOP command five times during the small loop in order to lower noise to below 10 dB. If it is required to further lower noise, the number of the NOP instructions, which is executed by the CPU 21 during the small loop, may be increased. However, since the peak value of noise is saturated at the background level, it is necessary to avoid unnecessary use of the capacity of the ROM 22, which is caused by unnecessarily increasing the number of the NOP instruction executed.

Since the CPU 21 executes the NOP instruction during the small loop, the repetition cycle of the small loop increases and the fundamental wave of noise becomes a low frequency. For this reason, though the number of harmonics included in the receiving frequency band of the receiver unit 1 increases, the peak values of noise decrease according to the harmonics and finally become the background level or less. In this state, although a number of harmonics is included in the receiving frequency band, the peak value of noise does not exceed the background level. Therefore, it is possible to realize the lowering noise of the receiver unit 1.

Figure 4:
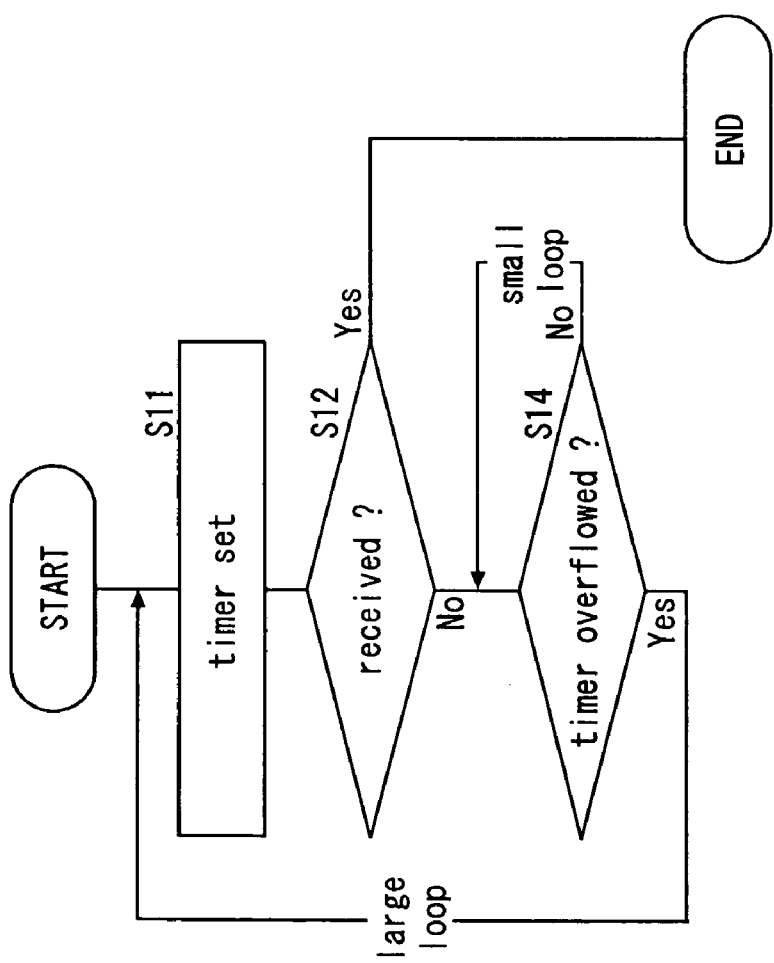
FIG. 4 is a flowchart illustrating a comparative example of the invention.

FIG. 4 shows a comparative example of the invention. In describing the comparative example of the invention, the same reference numbers as those in the first embodiment are given to the same or similar parts and detailed description thereof will be omitted. The microcontroller in the comparative example of the invention is the same as the microcontroller 20 of the first embodiment except for a routine for an operation in the reception standby mode of the program stored in the ROM. The operation of the microcontroller in the reception standby mode in the comparative example of the invention is the same as that of the first embodiment except that it does not include steps S131 to S135 (execution of the NOP instruction) of the first embodiment (FIG. 2).

Figure 5:
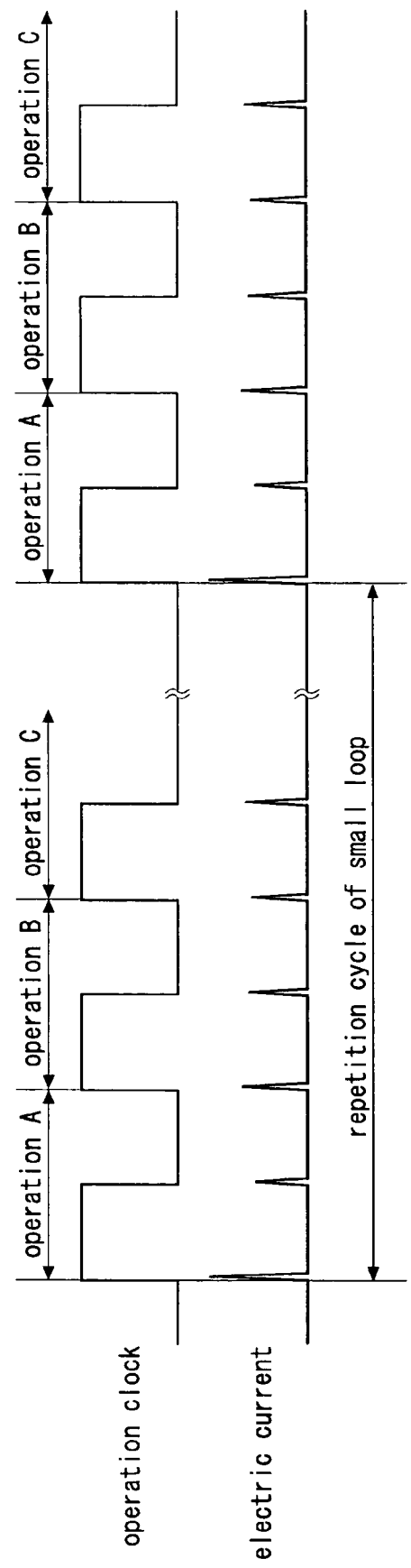
FIG. 5 is an explanatory view showing variations of an electric current of a microcontroller.

FIG. 5 shows variation of an electric current of the microcontroller. The electric current flows every operation clock of the microcontroller (rise and fall), but current values are different depending upon the operation of the microcontroller at that time. As the small loop (operations A, B, C, etc.) is repeatedly executed, noise is also repeatedly generated every repetition cycle of the small loop. When the repetition frequency of the small loop is a fundamental frequency f3, noise is generated in harmonics ($2 \times f3$, $3 \times f3$, $4 \times f3$, etc.) whose frequency is an integral multiplication of the fundamental frequency f3. Therefore, there is a possibility that one of the harmonics may be included in the receiving frequency band. For example, in the event that twenty cycles are needed to execute the small loop once, a noise fundamental wave whose frequency is 0.7925 MHz (15.85 MHz/20) exists. The harmonics are inevitably included in the receiving frequency band (314 to 316 MHz) of the receiver unit. This problem can be avoided by making less the number of cycles needed to execute the small loop once (i.e., by making small the repetition cycle of the small loop). However, since at least ten cycles are actually needed to execute the small loop once, it is not possible to avoid the problem. Consequently, physical noise measures are required thereby increasing the manufacturing cost of the receiver unit (the manufacturing cost of the keyless entry system).

As described above, in the first embodiment, since it is not necessary to make the system board multi-layered, install the metal cover or use lots of noise-prevention components, the lowering noise can be easily realized without increasing the cost of the keyless entry system. As a result, the receiver sensitivity of the receiver unit 1 (the RF receiver LSI 10) can be improved so as to increase the distance between the transmitter unit and the receiver unit 1, which can be controlled remotely. This can contribute to the improvement of the performance of the keyless entry system.

Figure 6:
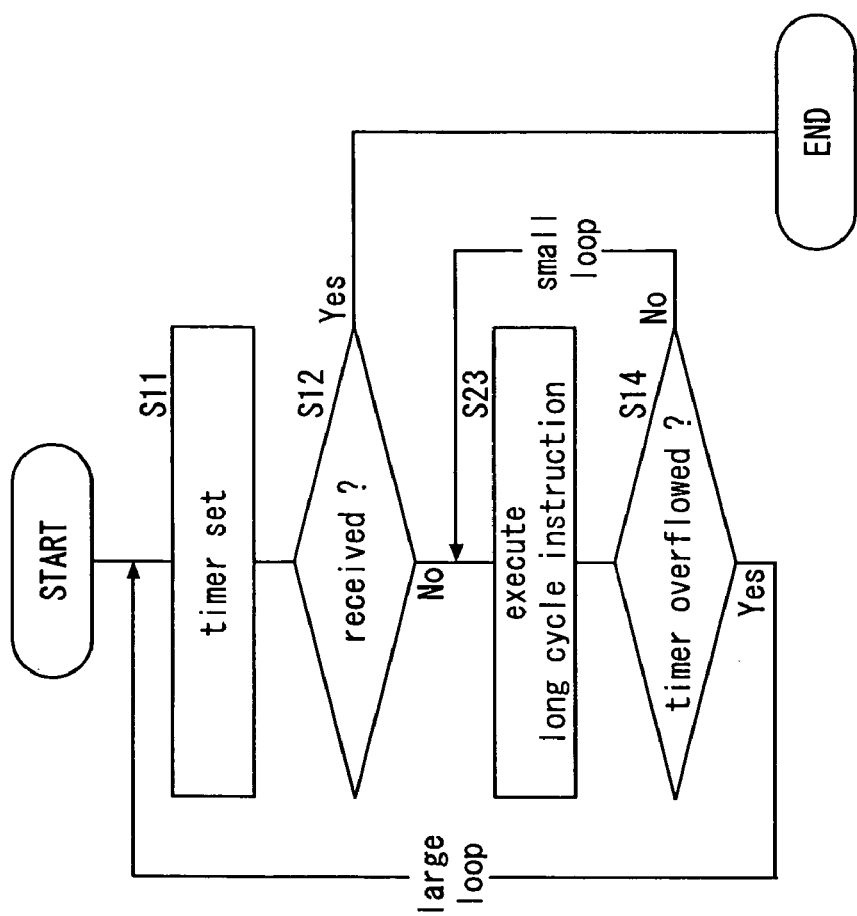
FIG. 6 is a flowchart illustrating a second embodiment of the invention.

FIG. 6 is a flowchart illustrating a second embodiment of the invention. In describing the second embodiment, the same reference numbers as those in the first embodiment are given to the same or similar parts and detailed description thereof will be omitted. The microcontroller in the second embodiment of the invention is the same as the microcontroller 20 of the first embodiment except that the operation routine in the reception standby mode of the program stored in the ROM is different and the instruction set of the CPU includes a long cycle instruction (a first dummy instruction). In this case, the long cycle instruction is an instruction in which the number of execution cycles (the number of cycles, which is required to execute the instruction) is greater than that of other instructions such as the NOP instruction. If the CPU executes the long cycle instruction, the CPU becomes a state executing nothing (standby state), e.g., in the same manner as the case where the CPU executes the NOP instruction. In addition, the microcontroller of the second embodiment is mounted in a same package together with the RF receiver LSI, for example, in the same manner as the first embodiment.

The operation of the microcontroller in the reception standby mode according to the second embodiment is the same as that of the first embodiment except that it includes step S23 (execution of the long cycle instruction) instead of steps S131 to S135 (execution of the NOP instruction) of the first embodiment (FIG. 2). Further, from the reason described in the first embodiment (FIG. 3), a further reduced noise effect can be realized by increasing the number of the execution cycles of the long cycle instruction or by allowing the CPU to execute the long cycle instruction several times during the small loop.

The above-mentioned second embodiment can also have the same effects as those of the first embodiment. Furthermore, as the CPU executes the long cycle instruction (e.g., the number of execution cycles: 5) once only, it is possible to obtain the same effect as when the NOP instruction (e.g., the number of the execution cycles: 1) is executed five times. Accordingly, it is possible to save the amount of programs corresponding to the small loop in the control program of the microcontroller compared to the first embodiment. Therefore, it is possible to effectively utilize the capacity of the ROM.

Figure 7:
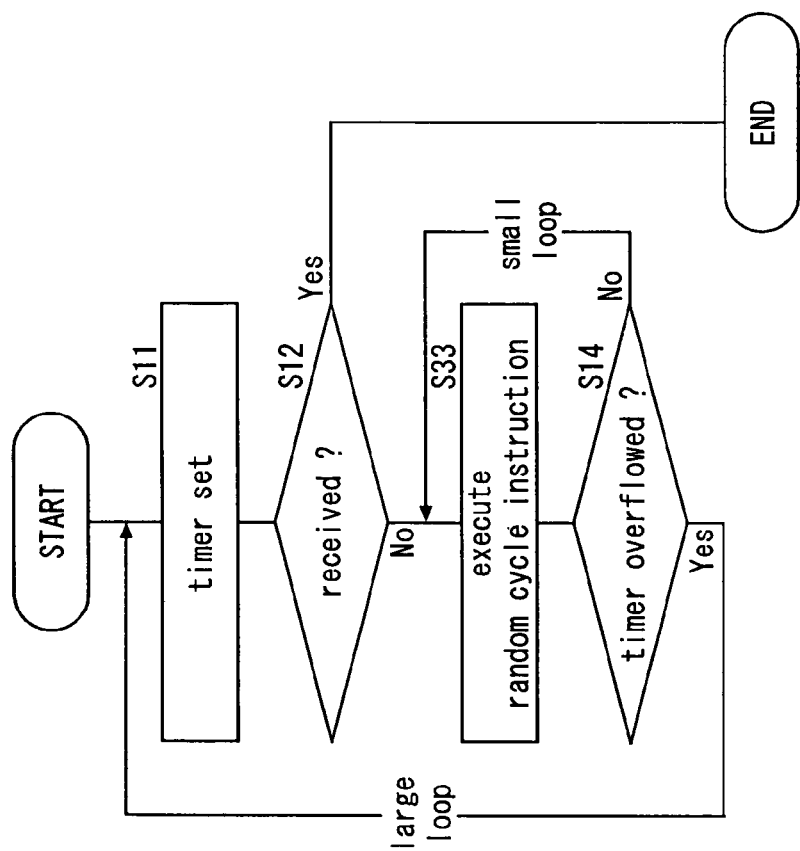
FIG. 7 is a flowchart illustrating a third embodiment of the invention.

FIG. 7 is a flowchart illustrating a third embodiment of the invention. In describing the third embodiment, the same reference numbers as those in the first embodiment are given to the same or similar parts and detailed description thereof will be omitted. The microcontroller in the third embodiment of the invention is the same as the microcontroller 20 of the first embodiment except that an operation routine in the reception standby mode of the program stored in the ROM is different and the instruction set of the CPU includes a random cycle instruction (a second dummy instruction). In this case, the random cycle instruction is an instruction in which the number of execution cycles randomly varies every executed instruction. When the CPU executes the random cycle instruction, the CPU becomes a state executing nothing, e.g., in the same manner as the case where the CPU executes the NOP instruction. Further, the microcontroller of the third embodiment is mounted in a same package together with the RF receiver LSI, e.g., in the same manner as the first embodiment.

The operation of the microcontroller in the reception standby mode according to the third embodiment is the same as that of the first embodiment except that it includes step S33 (execution of the random cycle instruction) instead of steps S131 to S135 (execution of the NOP instruction) of the first embodiment (FIG. 2).

In the above-mentioned third embodiment, since the random cycle instruction is executed during the small loop, the repetition cycle of the small loop can be changed. For this reason, the fundamental wave and harmonics of noise, which is generated along with the repetition of the small loop, can be distributed. Therefore, it is possible to lower a probability that the peak values of noise can be included in the receiving frequency band of the receiver unit. As a result, it is possible to obtain the same effects as those of the first embodiment.

Figure 8:
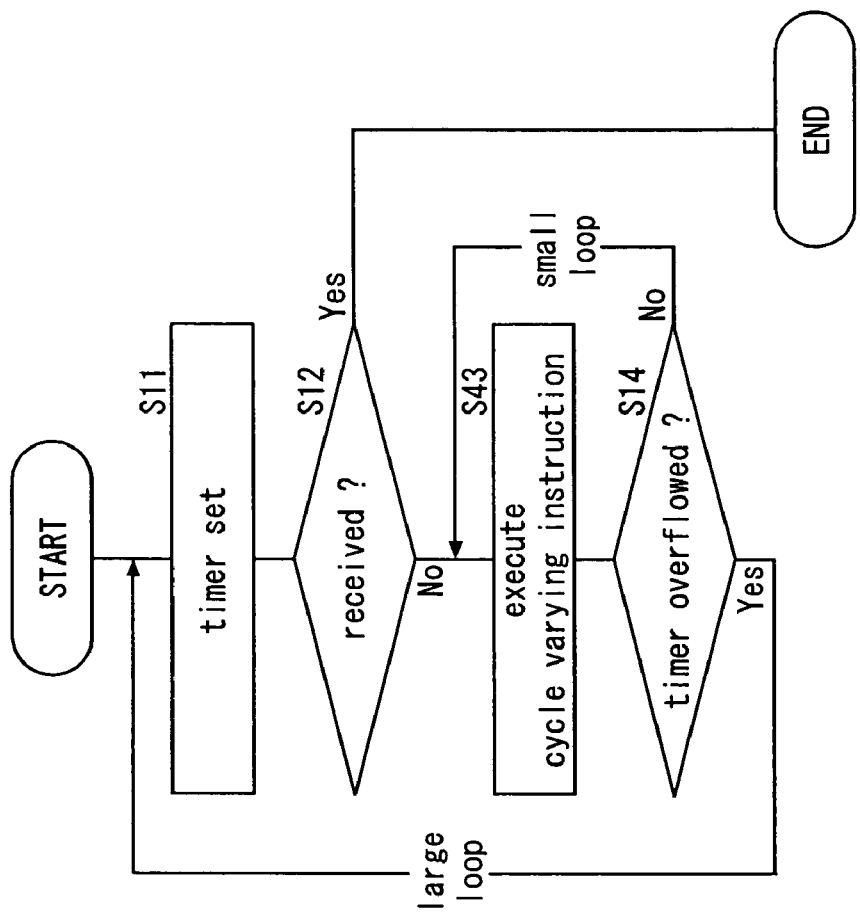
FIG. 8 is a flowchart illustrating a fourth embodiment of the invention.

FIG. 8 is a flowchart illustrating a fourth embodiment of the present invention. In describing the fourth embodiment, the same reference numbers as those in the first embodiment are given to the same or similar parts and detailed description thereof will be omitted. The microcontroller in the fourth embodiment of the invention is the same as the microcontroller 20 of the first embodiment except that an operation routine in the reception standby mode of the program stored in the ROM is different and the instruction set of the CPU includes a cycle varying instruction (a second dummy instruction). In this case, the cycle varying instruction is an instruction in which the number of execution cycles increases one by one every executed instruction. If the cycle varying instruction is executed by predetermined times (e.g., ten times), the number of execution cycles, when a next instruction is executed, is initialized to a predetermined value (e.g., 1). If the CPU executes the cycle varying instruction, the CPU becomes a state executing nothing, e.g., in the same manner as the case where the CPU executes the NOP instruction. In addition, the microcontroller of the fourth embodiment is mounted in a same package together with the RF receiver LSI, for example, in the same manner as the first embodiment.

The operation of the microcontroller in the reception standby mode according to the fourth embodiment is the same as that of the first embodiment except that it includes step S43 (execution of the cycle varying instruction) instead of steps S131 to S135 (execution of the NOP instruction) of the first embodiment (FIG. 2). In the above-mentioned fourth embodiment, since the repetition cycle of the small loop can be changed, it is possible to obtain the same effects as those of the first and third embodiments.

Furthermore, in the first embodiment, it has been described an example in which the CPU 21 executes the NOP instruction during the small loop in order to make large the repetition cycle of the small loop. However, the invention is not limited thereto. For example, the CPU 21 may execute other instructions (e.g., an addition instruction using a general-purpose register that is not used, etc.), which do not have an influence on the operation of the microcontroller 20 in reception mode, instead of the NOP instruction.

In the fourth embodiment, it has been described an example in which the number of execution cycles of the cycle varying instruction increases every executed instruction. However, the invention is not limited thereto. For example, the number of execution cycles of the cycle varying instruction may decrease every executed instruction at a predetermined value (e.g., 10) being set to an initial value. If the cycle varying instruction is executed by predetermined times (e.g., ten times), the number of execution cycles, when a next instruction is executed, is initialized to a predetermined value. Further, the number of execution cycles of the cycle varying instruction may repeatedly increase or decrease every predetermined times (e.g., five times).

The invention is not limited to the above embodiments and various modifications may be made without departing from the spirit and scope of the invention. Any improvement may be made in part or all of the components.

What is claimed is:

1. A microcontroller that receives and processes a demodulation signal generated by a receiver circuit on a receiving part of a wireless system, comprising:
   a memory that stores a control program of said microcontroller, said control program including a dual loop routine for an operation in reception standby mode, and said dual loop routine having a first loop and a second loop included in said first loop; and a CPU which has an instruction set consisting of a plurality of instructions and operates according to the control program stored in said memory, wherein said CPU keeps a repetition cycle of said second loop a desired length by executing an instruction irrelevant to an operation of said microcontroller in reception mode a fixed number of times in said second loop in each execution of said second loop, the repetition cycle of said second loop being time required from beginning to end of an execution of said second loop, and the fixed number of times is set to be greater than or equal to a number of times a peak value of a noise being lowered below a desired level and to less than or equal to a number of times the peak value of the noise being saturated, based on a characteristic in which the peak value of the noise generated in harmonics, whose frequency is an integral multiple of a repetition frequency of said second loop, becomes lower as the repetition cycle of said second loop increases due to increasing in the fixed number of times, and saturates at a background level.

2. The microcontroller according to claim 1, wherein said plurality of instructions includes an NOP instruction, and said instruction irrelevant to said operation of said microcontroller in reception mode is said NOP instruction.

3. The microcontroller according to claim 1, wherein: said plurality of instructions includes a first dummy instruction which requires a larger number of cycles for execution than other instructions, and said instruction irrelevant to said operation of said microcontroller in reception mode is said first dummy instruction.

4. The microcontroller according to claim 1, wherein said memory and said CPU are mounted in a same package together with said receiver circuit.

\* \* \* \* \*